(12) United States Patent
Frackelton et al.

(10) Patent No.: US 6,487,911 B1
(45) Date of Patent: Dec. 3, 2002

(54) PRESSURE SENSOR APPARATUS

(75) Inventors: Peter H. Frackelton, Rumford, RI (US); Stanley J. Lukasiewicz, North Attleboro, MA (US)

(73) Assignee: Texas Instruments Incorporated, Dallas, TX (US)

( * ) Notice: Subject to any disclaimer, the term of this patent is extended or adjusted under 35 U.S.C. 154(b) by 57 days.

(21) Appl. No.: 09/717,763

(22) Filed: Nov. 21, 2000

(51) Int. Cl.[7] ................................................ G01L 7/00
(52) U.S. Cl. ......................................... 73/718; 73/714
(58) Field of Search .......................... 73/700, 715, 706, 73/714, 716, 717, 718, 724, 756, 736; 361/283.1, 283.2, 283.3, 283.4; 174/50; 455/90

(56) References Cited

U.S. PATENT DOCUMENTS

| | | | |
|---|---|---|---|
| 4,716,492 A | | 12/1987 | Charboneau et al. |
| 4,875,135 A | * | 10/1989 | Bishop et al. ............... 73/724 |
| 4,888,662 A | * | 12/1989 | Bishop ....................... 73/726 |
| 5,159,525 A | * | 10/1992 | Tate ............................ 73/718 |
| 5,880,371 A | | 3/1999 | Beringhause et al. |
| 6,223,603 B1 | * | 5/2001 | Mckinnon ................... 73/756 |

* cited by examiner

Primary Examiner—Benjamin R. Fuller
Assistant Examiner—Andre Allen
(74) Attorney, Agent, or Firm—Russell E. Baumann; Frederick J. Telecky, Jr.

(57) ABSTRACT

A fluid pressure sensor (10) has a generally polyhedron configured capacitive transducer (18) electrically connected to a flexible circuit using interference fit U-shaped edge connectors (20). The flexible circuit (16) is received in an electronics chamber formed in a top end of a base member (12) with the corners of the transducer disposed on the face surface (12f) of the top. A cover (24) is formed with a circular fluid pressure opening (24a) through which a sealing gasket (22) extends, the gasket having tabs (22a) received in a seat (24c) formed in the bottom surface of the top wall (24b) of the cover. A transducer receiving seat (24d) is also formed in the bottom surface of the cover for placement of transducer (18). The cover is formed with opposing legs (24h) which interfit with notches (12d) in the base and a third leg (24n) slidingly received in a slot formed in the base through which conductive tails (16h) of the flexible circuit (16) extend for electrical engagement with a hexport (26) slidingly received over the cover and top portion of the base member.

13 Claims, 9 Drawing Sheets

PRESSURE SENSOR APPARATUS

FIELD OF THE INVENTION

This invention relates generally to pressure sensors and more particularly to apparatus for housing pressure responsive, variable, parallel plate capacitive transducers having, in plan view, a rectangular configuration and associated conditioning electronics.

BACKGROUND OF THE INVENTION

Sensors comprising pressure responsive, variable, parallel plate capacitive transducers having a generally circular disc shaped configuration are well known. An example of such sensors is shown and described in U.S. Pat. No. 4,716,492, assigned to the assignee of the present invention. In that patent a capacitive transducer is shown having a thin, generally cylindrical ceramic diaphragm mounted in closely spaced, sealed, overlying relation to a generally cylindrical ceramic base with metal layers on respective facing surfaces of the diaphragm and base to serve as capacitor plates arranged in predetermined closely spaced relation to each other to form a capacitor. Transducer terminals connected to the capacitor plates are arranged at an opposite surface of the transducer base and a signal conditioning electrical circuit, connected to the transducer terminals, is mounted on the transducer. A cup-shaped connector body of electrical insulating material is fitted over the electrical circuit and is secured to the transducer by a port fitting which has a port for exposing the transducer diaphragm to an applied fluid pressure. The diaphragm is movable in response to variations in fluid pressure applied to the diaphragm to vary the capacitance of the capacitor in accordance with the changes in applied pressure and the electrical circuit provides an electrical output signal corresponding to the applied pressure.

In copending U.S. Pat. No. 5,880,371, rectangular (in plan view) pressure sensing capacitive transducer elements are disclosed and claimed. The present invention relates to apparatus for housing such rectangular transducer elements.

SUMMARY OF THE INVENTION

It is an object of the present invention to provide a suitable package for housing a generally rectangular, in plan view, fluid pressure sensing capacitive transducer. Yet another object is the provision of a housing for receiving rectangular-shaped (in plan view) transducer elements which has essentially the same outer shape and dimensions as housings used for receiving cylindrical fluid pressure sensing capacitive transducers already in the market place so that the packages can be interchanged in a common application. Yet another object of the invention is the provision of a package having a cylindrical port fitting for interfacing with a fluid pressure source whose pressure is to be monitored having a rectangular-shaped (in plan view) sensing element mounted therein in which a circular sealing element is reliably received between the port fitting and the sensing element. Yet another object of the invention is the provision of connector means for electrically interconnecting a generally thin, rectangular (in plan view) sensing element to an electrical circuit mounted in the package and for providing a suitable interconnection between a ground conductor of the electrical circuit and the port fitting.

Briefly, in accordance with the invention, a base assembly has a first base member formed of electrically insulating material mounting a plurality of elongated terminal members in spaced apart, parallel relationship with an end of the terminal members received in an electronics chamber formed at one end of the first base member. A flexible circuit bent generally in a U-shaped configuration with one lobe portion overlying a second lobe portion is received in the chamber for attachment of terminal pads of the circuit on one, the first, lobe portion with the terminal members. A ground portion extends from the flexible circuit out of the chamber through a slot formed in the first base member. A pressure sensing capacitive transducer element has a rectangular configuration in plan view and is composed of a substrate having a diaphragm thereon with the contact pads on an outer surface along an edge of the element. The transducer element is butted up against an upstanding lip extending from the outer end of the other, the second, lobe portion of the flexible circuit. Generally U-shaped edge connectors are received over the edge of the transducer element and outer end of the second lobe portion to electrically join the contact pads and electrical circuitry of the flexible circuit.

A cover, or second base member, is receivable over the top of the base member and is formed with a wall having a circular fluid pressure receiving opening and with a first sealing gasket seat and a second sensing element seat coaxially formed in the wall with the circular opening. A generally circular, annular sealing gasket is received in the circular opening of the cover and is provided with outwardly extending tabs received on the first gasket seat and the sensing element is received in the second sensing element seat. The cover is provided with opposing leg members having an outer lip which are received in slots formed in the first base member and snap into transversely extending openings or notches to attach the cover to the first base member with the corner portions of the rectangular transducer element received on the end face of the first base member. A port fitting of suitable material, such as aluminum, is then received over the cover and is clamped to a circumferential flange of the first base member and with the ground portion of the flexible circuit pressed against the port fitting.

BRIEF DESCRIPTION OF THE DRAWINGS

Other objects, advantages and details of the novel and improved capacitive pressure sensor of the invention appear in the following detailed description of the preferred embodiment of the invention, the detailed description referring to the drawings in which.

DETAILED DESCRIPTION OF THE PREFERRED EMBODIMENT

Figure 1:
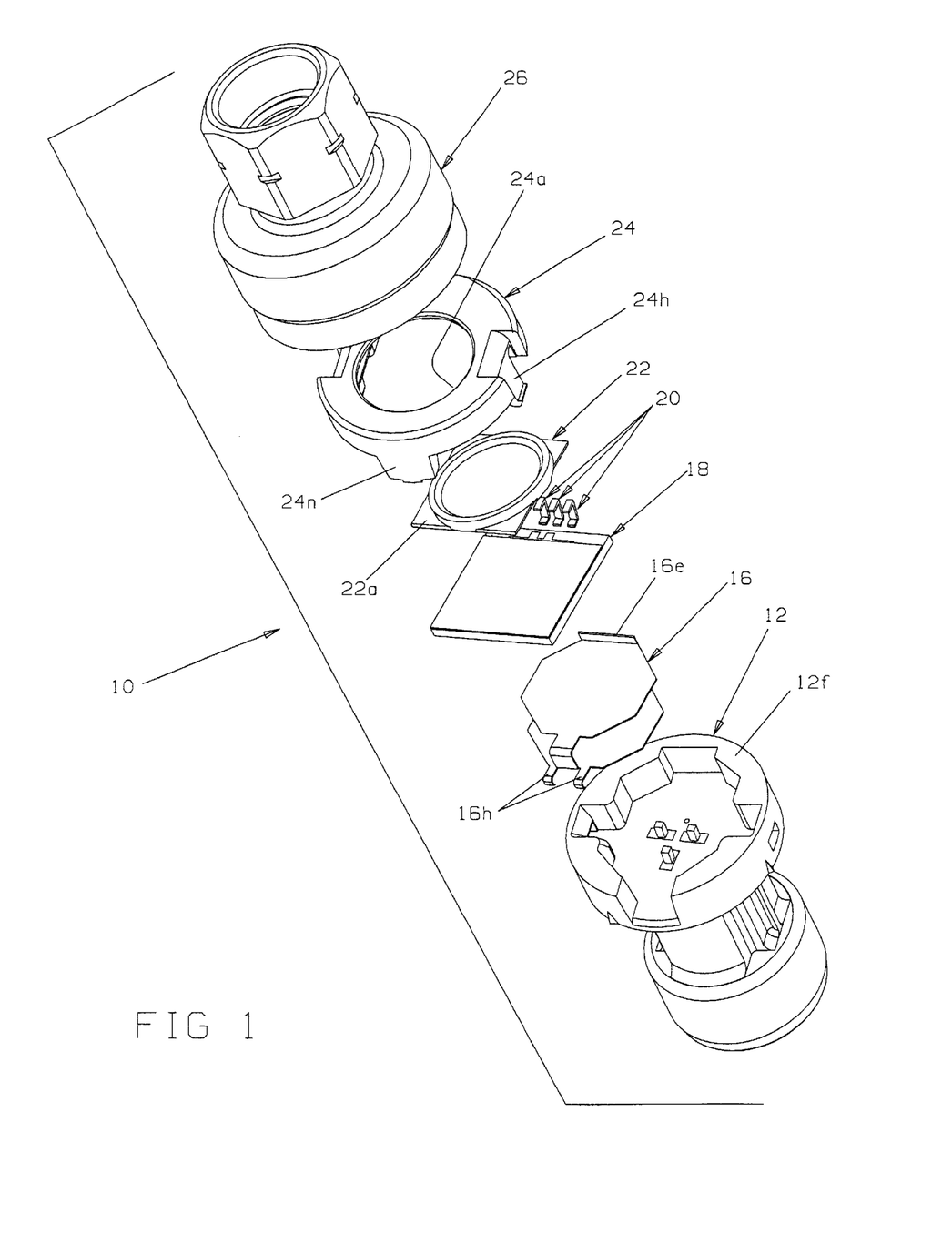
FIG. 1 is an exploded perspective of a pressure sensor made in accordance with the preferred embodiment of the invention.
Figure 2:
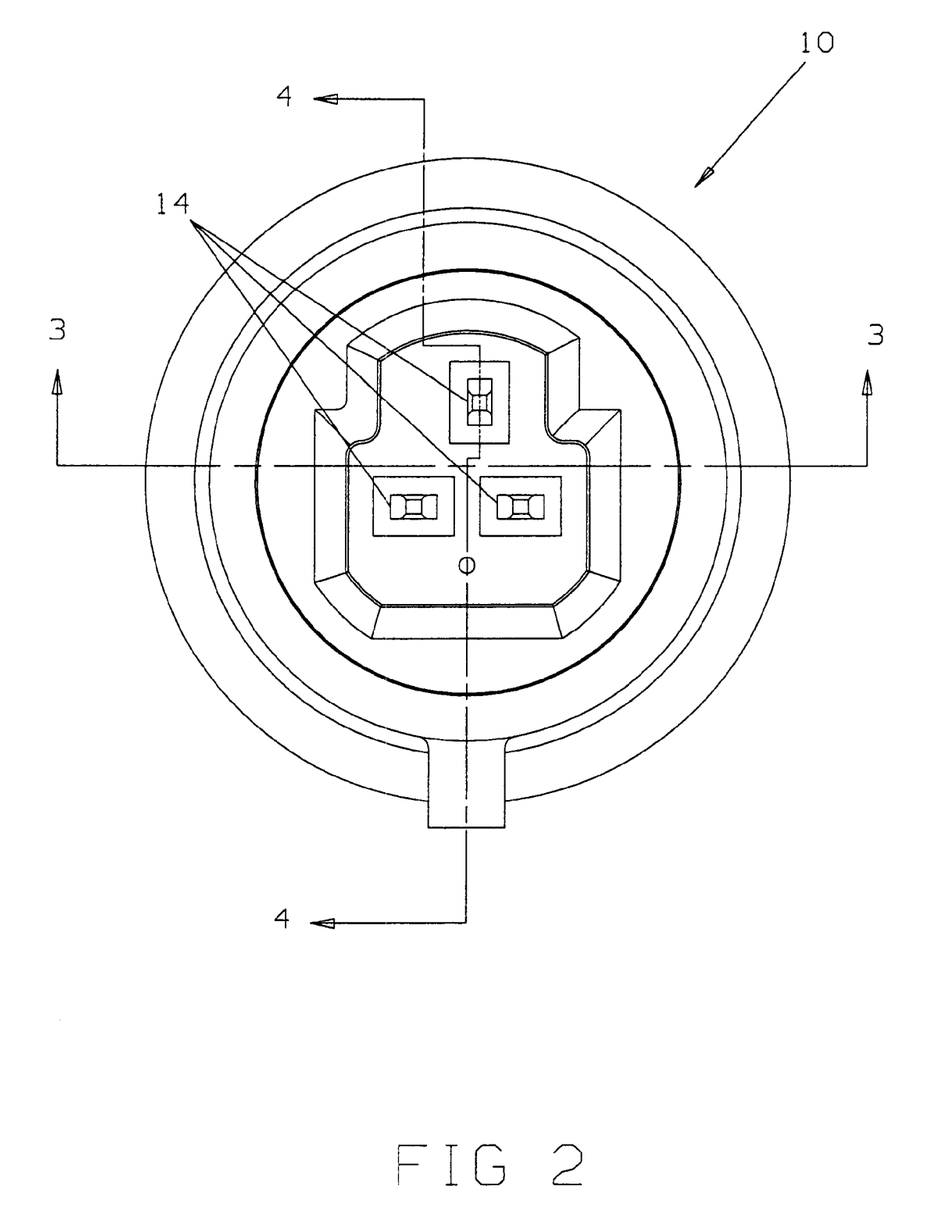
FIG. 2 is a bottom plan view of the FIG. 1 sensor.
Figure 3:
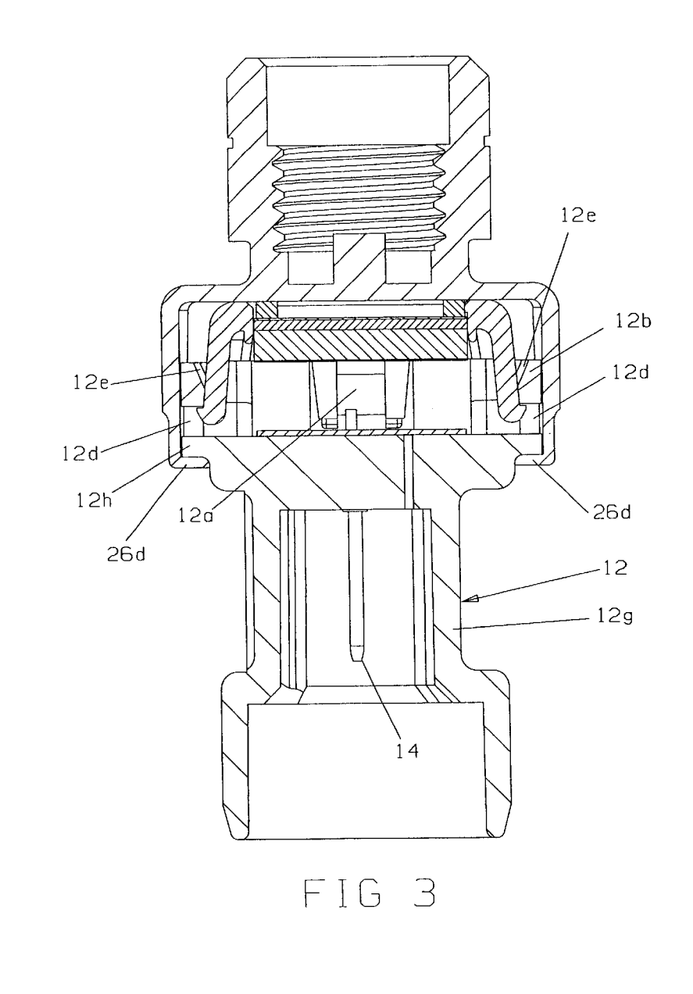
FIG. 3 is a cross sectional view taken on line 3—3 of FIG. 2.
Figure 4:
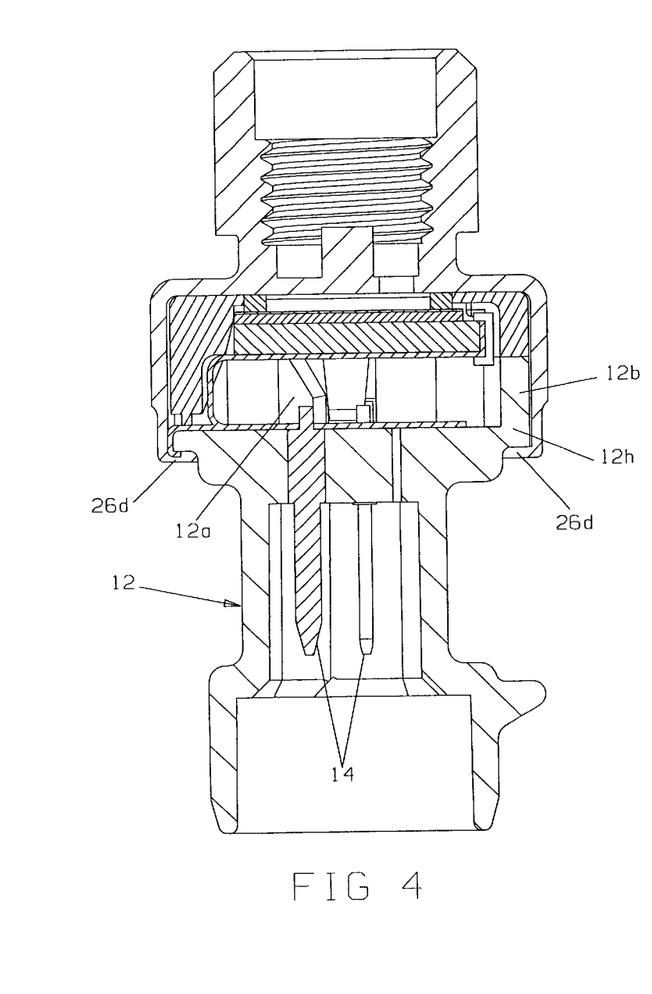
FIG. 4 is a cross sectional view taken on line 4—4 of FIG. 2.
Figure 5:
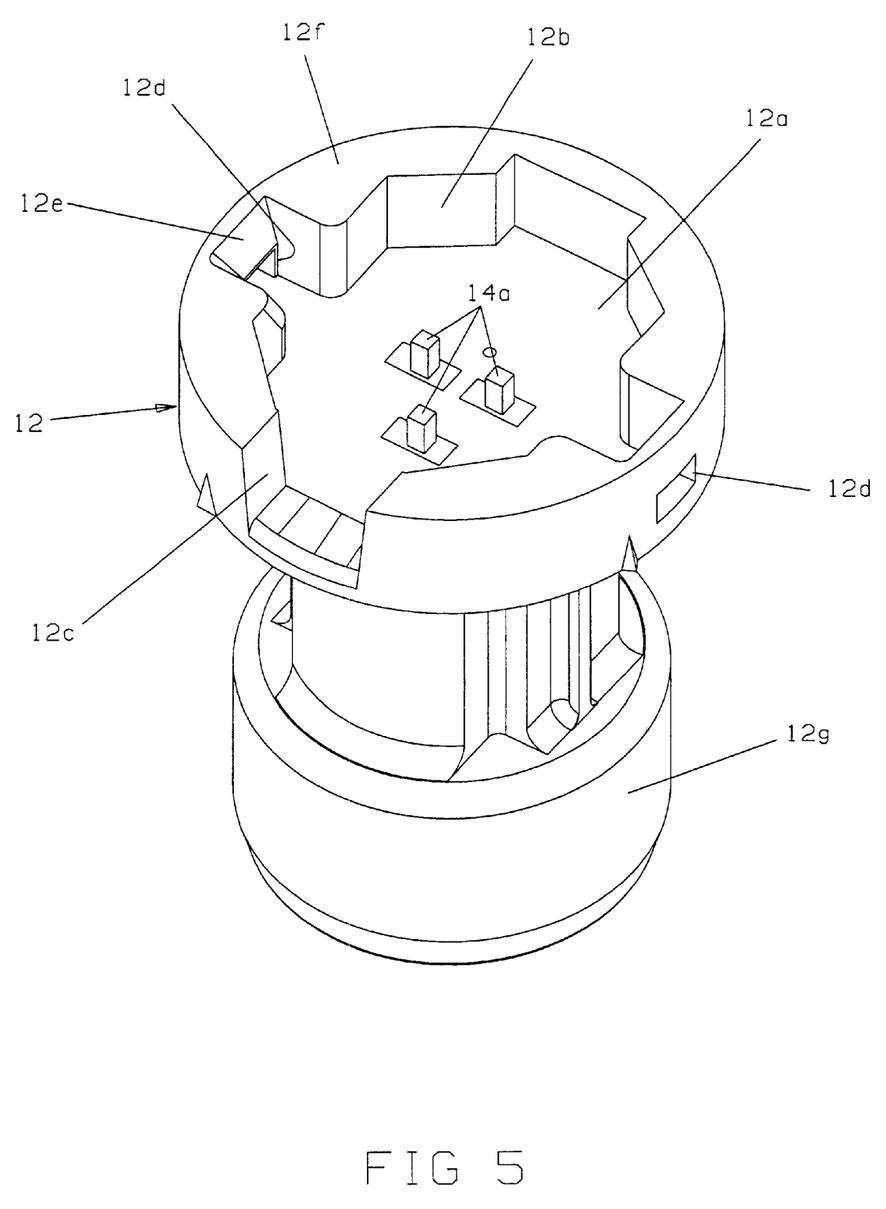
FIG. 5 is a perspective view of the first base member of the FIG. 1 sensor.

With reference to FIG. 1, a fluid pressure capacitive transducer 10 is shown comprising a first base member 12, a flexible circuit 16, a generally parallelepiped configured capacitive sensor 18, edge clips 20, a gasket seal member 22, a second base member or cover 24 and a port fitting 26.

First base member 12, best seen in FIGS. 2–5, is generally formed of suitable electrically insulative, moldable material, such as Noryl, and mounts therein a plurality of elongated terminal members 14 in spaced apart relation with a distal end 14a of each terminal received in an electronics receiving recess 12a formed at one end of the base member. The opposite end 12g of base member 12 forms a shroud for terminal members 14. Sidewall 12b extending around the periphery of recess 12a is formed with a ground tab receiving slot 12c, to be discussed, and with opposed notches 12d having an inclined lead in surface 12e for facilitating mounting of interfitting leg members of a second base member to be discussed. The thickness of wall 12b is selected so that the end face 12f of base member 12 will receive therein corner portions of the generally rectangular (in top plan view) shaped sensing element, to be discussed.

Figure 6:
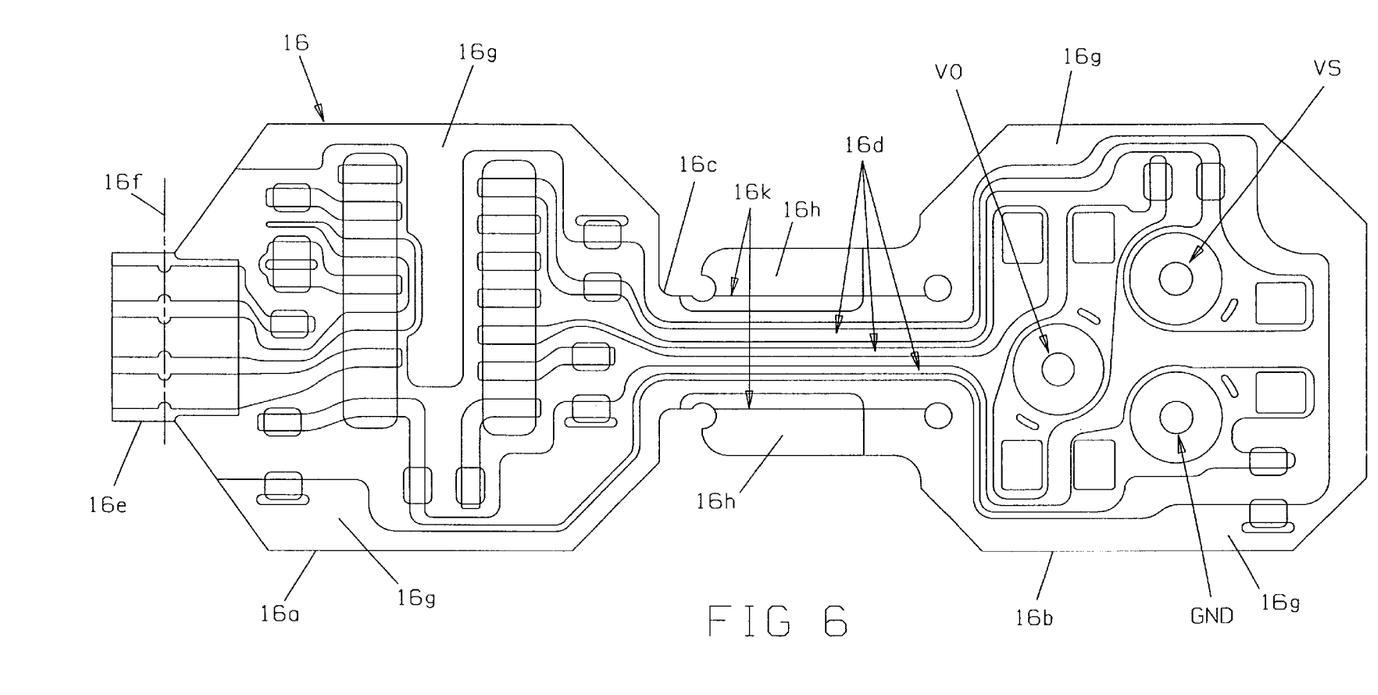
FIG. 6 is a top plan view of flexible circuit prior to being bent into a U-shaped configuration for receipt in the FIG. 1 sensor with the end portion of one lobe portion bent to form an outwardly extending lip.
Figure 7:
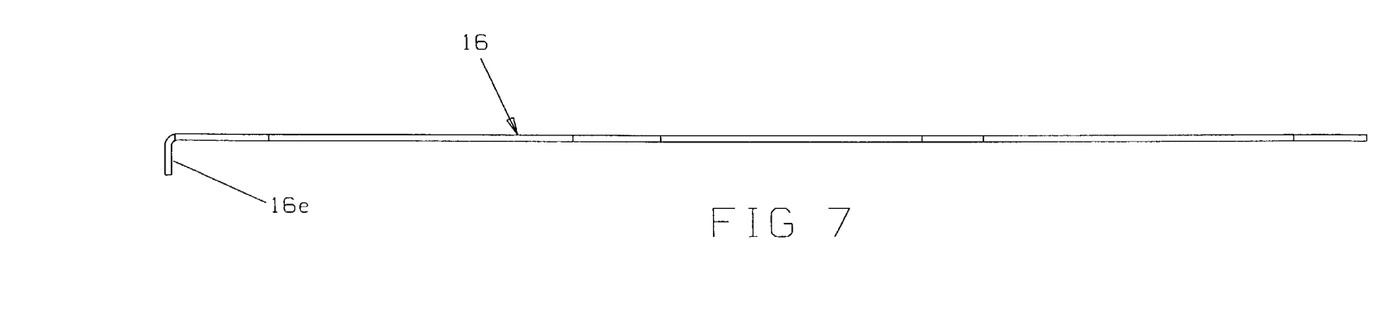
FIG. 7 is a front view of the FIG. 6 flexible circuit.

Flexible circuit 16, formed of copper traces 16d on a suitable substrate such as a polyimide and preferably having a cover layer of polyimide, has first and second lobe portions 16a, 16b joined by an intermediate central portion 16c. Solder pad portion 16e at one end is bent generally 90° along line 16f to form a fold or downwardly extending lip to facilitate installation of edge clips 20, to be discussed. The outer cover of polyimide is etched away to expose ground layer 16g and ground tails 16h are formed in central portion 16c by slitting the flexible circuit along lines 16k.

Figure 8:
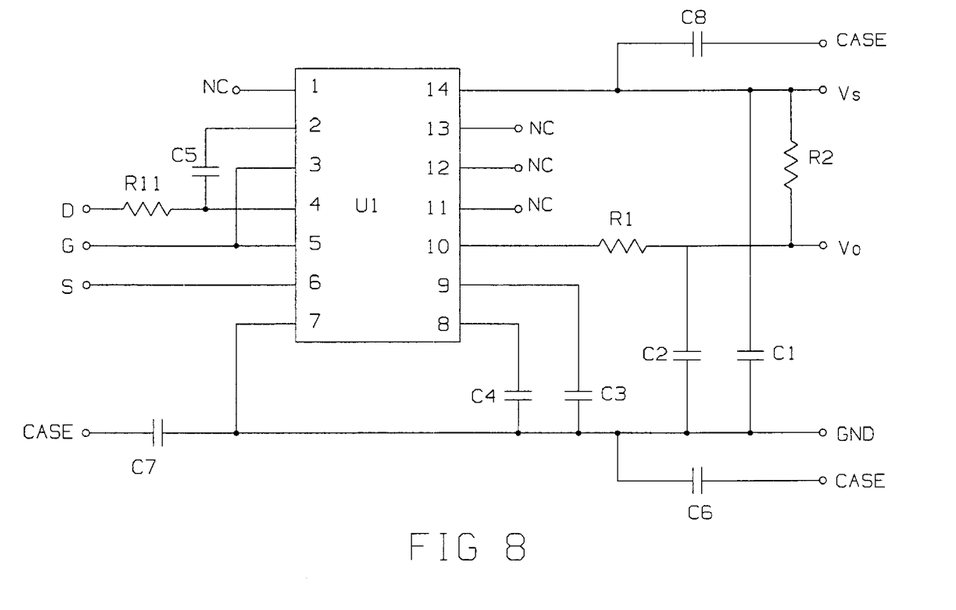
FIG. 8 is a schematic diagram of the FIG. 1 sensor.

The schematic circuit of FIG. 8, including integrated circuit U1, resistors and capacitors use the circuit paths of FIG. 6 and serves as conditioning electronics.

Lobe portion 16b is placed in electronic chamber 12a with terminal end portions 14a received through apertures VO, VS and GND and soldered to solder pads surround the respective apertures. Flexible circuit 16, at this point, extends out beyond chamber 12a with central portions 16c received in slot 12c of wall 12b of first base member 12.

Figure 9:
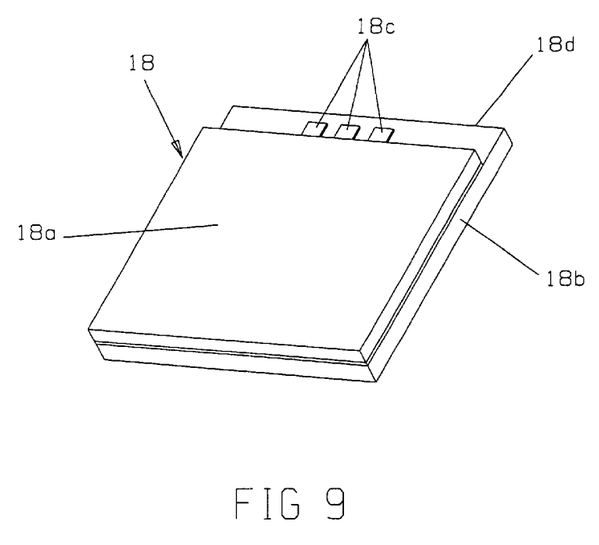
FIG. 9 is a perspective view of a capacitive sensing element used in the FIG. 1 sensor.
Figure 9A:
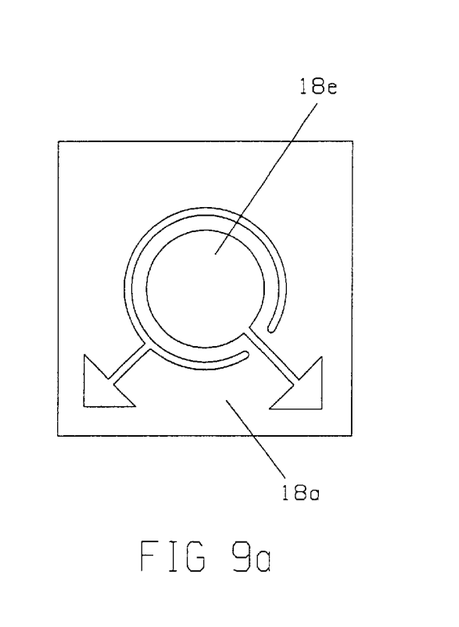
FIGS. 9a and 9b are respective plan views of the diaphragm and the substrate of the FIG. 9 capacitive sensing element.
Figure 9B:
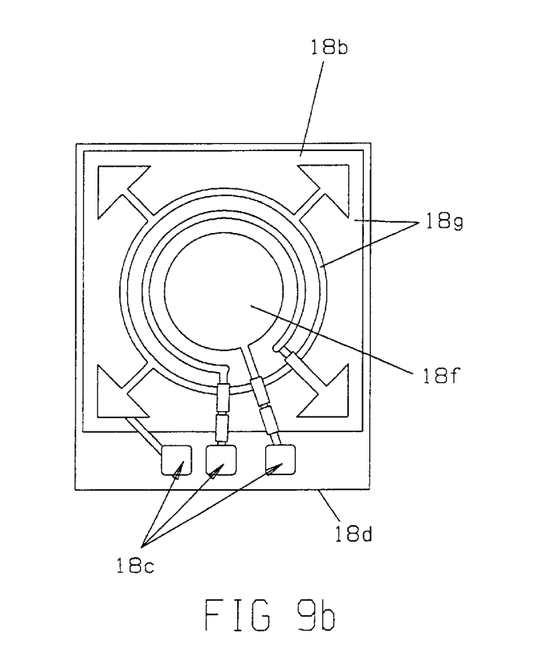
Figures 10, 11:
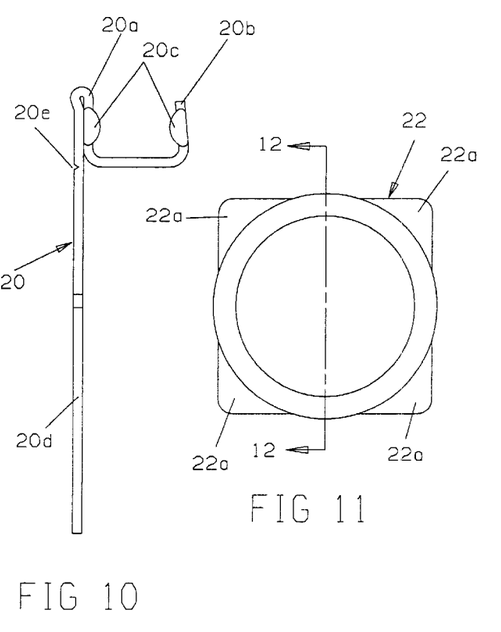
FIG. 10 is a side view of an edge clip attached to a frame element.
FIG. 11 is a top plan view of a sealing element or gasket used in the FIG. 1 sensor.

Capacitive transducer 18, generally rectangularly shaped in top plan view, see FIGS. 9, 9a, 9b, has a relatively thin diaphragm 18a received on a relatively thick substrate portion 18b with terminal solder pads 18c adjacent edge 18d of the substrate left exposed or uncovered by the diaphragm. Capacitor plates 18e and 18f are deposited on opposed faces of the diaphragm 18a and substrate 18b respectively which are disposed in spaced apart relation by glass separation material 18g. End 18d of transducer 18 is butted up against the fold or lip in the solder pad portion 16e of the flexible circuit with the solder pads of the transducer and the flexible circuit in alignment and edge clips 20 (FIGS. 1 and 10) are then pushed over the edge of the substrate and flexible circuit with an interference fit. Edge clips 20 are generally U-shaped having first and second legs 20a, 20b preferably with each leg having a solder pad 20c. Legs 20a and 20b are preferably spaced apart a distance selected to form an interference fit with the transducer and flexible circuit layer thereon. An edge clip 20 is shown in FIG. 10 with a leader 20 used for handling purposes and which is broken off at score 20e. After the edge clips are installed a reflow soldering operation is performed to form a good electrical connection between each solder pad of transducer 18 with a respective solder pad of flexible circuit 16. The folded portion 16e of the flexible circuit not only serves as a reference point for positioning the transducer but also allows the placement of the edge clips preventing movement of the flexible circuit substrate as the edge clips are forced onto the transducer and layer of the flexible circuit substrate.

Figure 14:
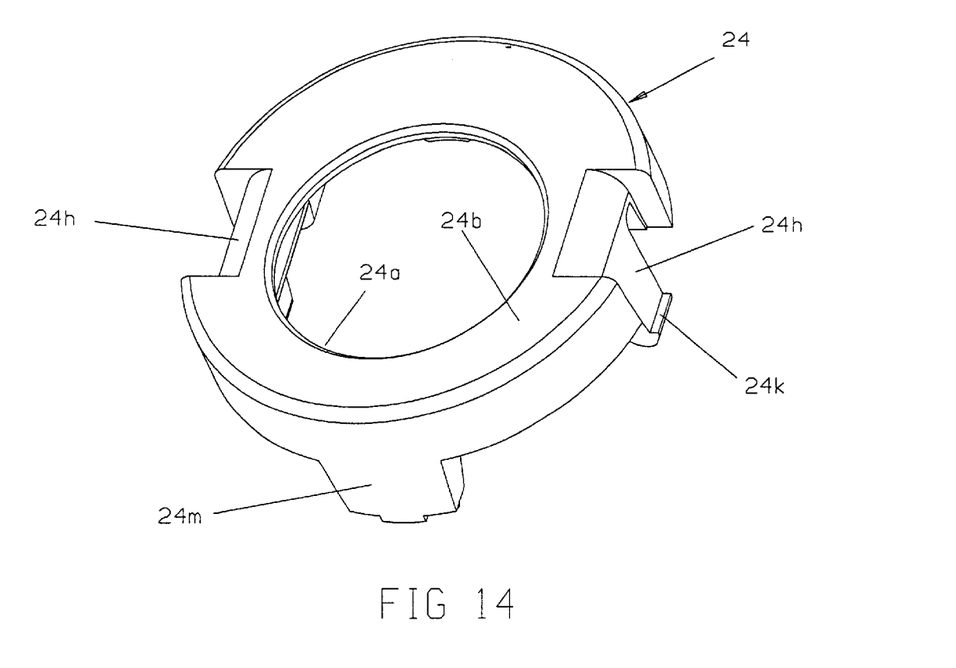
FIG. 14 is a perspective view of the second base member, or cover, taken from above.
Figure 15:
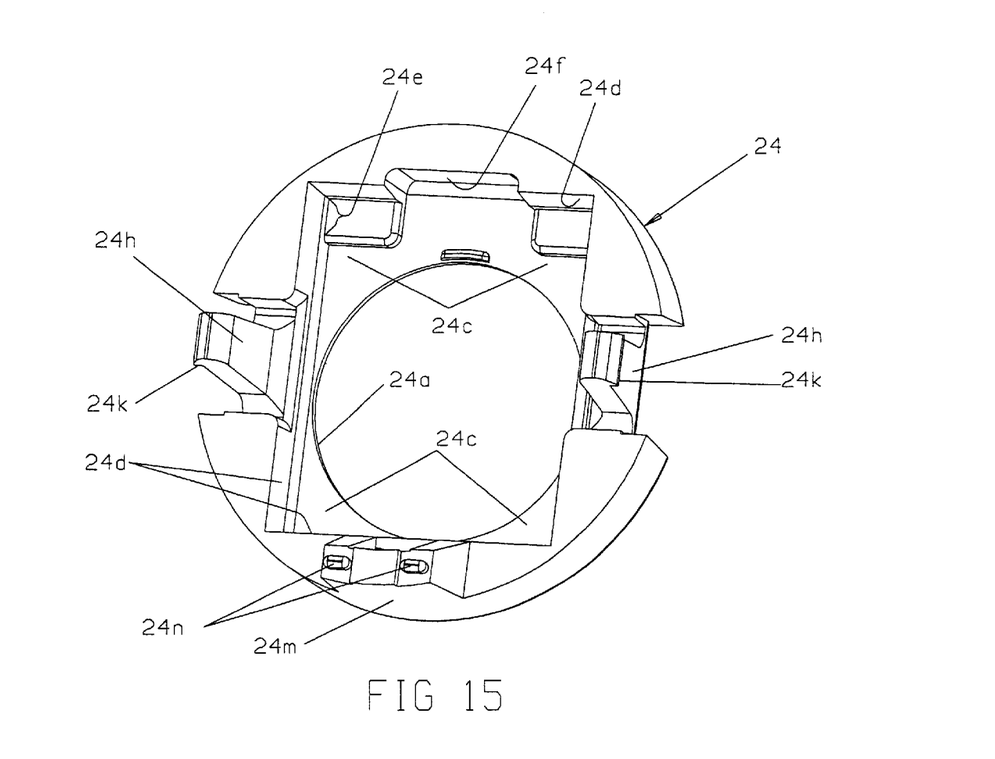
FIG. 15 is a perspective view of the cover of FIG. 13 but taken from below.
Figure 16:
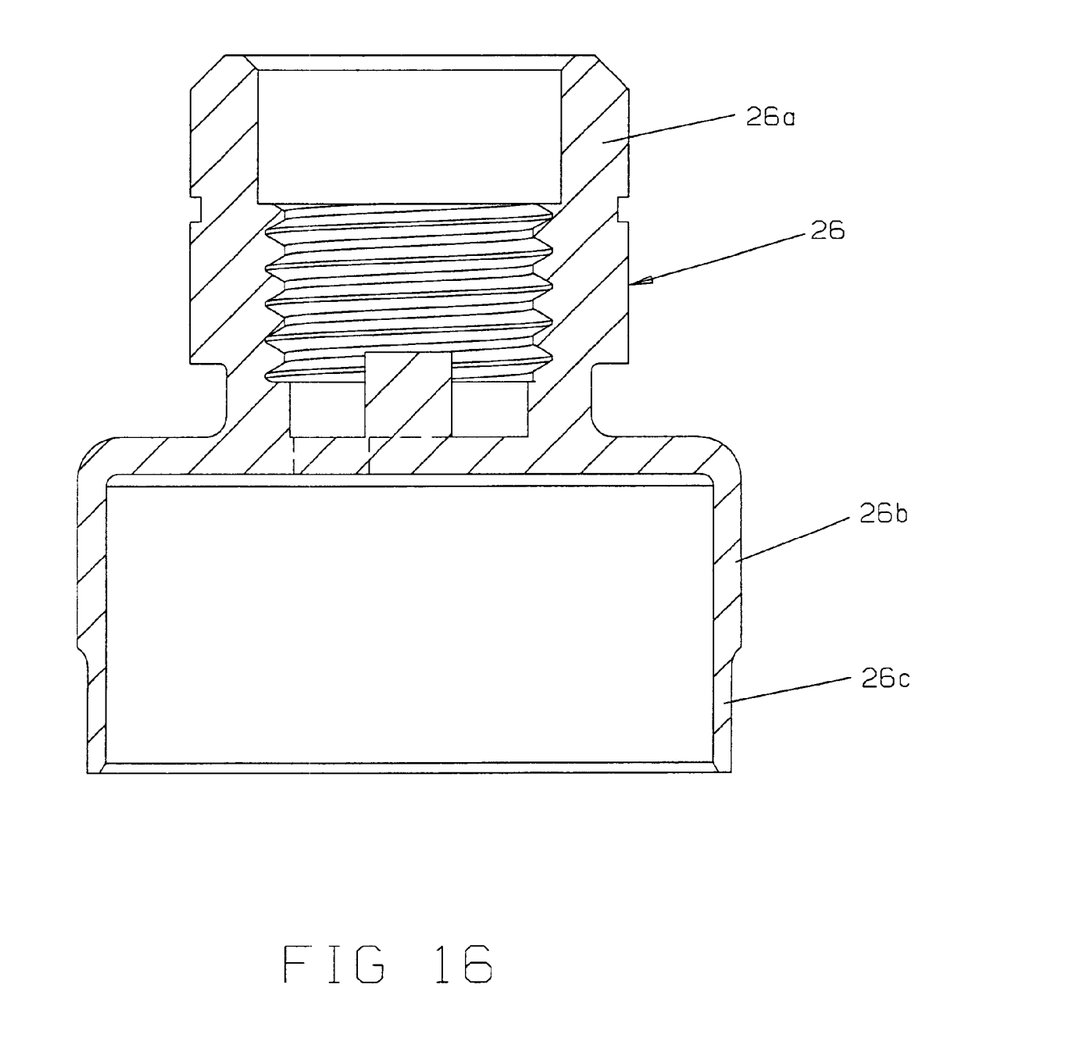
FIG. 16 is a cross sectional view taken through a port fitting used in the FIG. 1 sensor.

The second base member, or cover 24, best seen in FIGS. 14, 15, is a generally circular member having a circular opening 24a formed through top wall 24b. The lower surface of wall 24b is formed with a sealing gasket seat having four tab receiving portions 24c. A second co-aligned, generally rectangular recessed seat 24d, complimentary to the shape of transducer 18, is also formed in the lower surface of wall 24b for receiving transducer 18 in nesting relation thereon. Seat 24d is elongated at one end (see 24e) and recessed further at 24f to provide clearance for edge clips 20. Circular opening 24a is aligned with the center of diaphragm 18a and offset from the center of cover 24 essentially by the elongated portion 24e.

Cover 24 is provided with opposed, downwardly extending legs 24h each having an outwardly extending lip 24k at the distal end thereof for engagement in notches 12d of base member 12. It will be noted that inclined lead in surfaces 12e of base member 12 are provided to facilitate placement of cover 24 by camming the distal ends of legs 24h inwardly as the cover is pushed onto base 12 until lips 24k are received in notches 12d.

After transducer 18 is attached to flexible circuit 16, lobe portion 16a to which transducer 18 is attached, is bent back over lobe portion 16b with its movement limited by engagement of the corners of transducer 18 with end face 12f of base member 12 and with ground tails 16h projecting through slot 12c of base member 12. Cover 24 is provided with a third downwardly depending leg 24m which is slidably received in slot 12c with projections 24n on the end face of leg 24m providing a back-up surface for positioning ground tails 16h.

Figure 12:
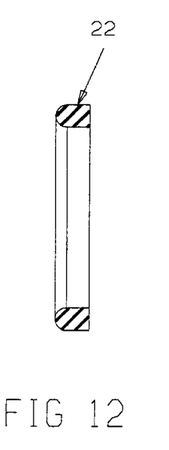
FIG. 12 is a cross sectional view taken on line 12—12 of FIG. 11.
Figure 13:
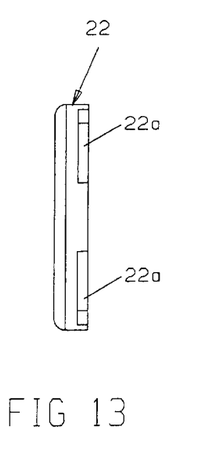
FIG. 13 is a side elevational view of the FIG. 11 gasket.

Annular sealing gasket 22 (FIGS. 11–13) is a generally circular element formed of suitable flexible material and is provided with a plurality of outwardly extending tabs 22a. Although four such tabs are shown, the particular number of tabs provided is a matter of choice. The tabs serve as positioning and handling members to facilitate placement in seat 24c with the circular element disposed in opening 24a. With sealing gasket 22 in place, base member 12 with the flexible circuit and transducer mounted thereon, can be inverted and placed onto cover 24 with leg 24m received in slot 12c and opposed legs 24h cammed inwardly until lips 24k are received in notches 12d.

Hexport 26 formed of suitable material, such as aluminum, has a threaded fluid coupling tubular portion 26a shown with an internal thread; although it will be appreciated that an external thread could be employed, if desired, and a cup shaped portion 26b formed with a sidewall having an attenuated outer portion 26c. The base assembly of base member 12 and cover 24 is inserted into the cup shaped portion 26b and the distal free end of the attenuated sidewall is crimped over flange 12h of base member 12 at 26d (see FIGS. 3, 4).

According to the invention, the second base member or cover provides a back-up for the internal pressure seal, a geometric relation between the sensing element and the internal seal, a support for the flex tail connection to the hexport, electrical insulation between the edge clips and the floor of the hexport, a hard stop to control compression of the sealing gasket, a means for retention of the internal seal for manufacturing assembly and for retention of the flexible circuit/transducer element prior to final assembly, a means for locating the transducer element on structural supports and for protecting the corners of the transducer element from damage during assembly while a reduced access depth to the terminal pins facilitate manual soldering of the flex circuit to the terminals. Features of the first base member includes interlocking retention with the second base member (cover) and a tail window flush with the terminal pins for allowing flex circuit optimization. The lip of the flexible circuit provides a positive stop for location of the flexible circuit relative to the transducer element with the edge clips providing connection to parallel, opposite surfaces of the flexible circuit and transducer element. Forming the hexport connection tails from within the overall circuit profile minimizes scrap material. The tabs on the sealing gasket facilitates retention of the gasket by the second base member (cover) for manufacturing assembly and the flat bottom of the gasket allows greater height to width ratio without causing bucking of the cross-section thereby increasing structural stability.

It should be understood that although the preferred embodiment of the invention has been described by way of illustrating the invention, various modifications can be made within the purview of the invention. For example, the U-shaped edge clips 20 used with transducer 18 and flexible circuit 16 facilitated by butting the transducer against the fold in solder pad portion 16e can be used with other condition responsive sensor elements such as strain gauge sensors. It is intended to include all modifications and equivalents of the described embodiment falling within the scope of the appended claims.

What is claimed:

1. A fluid pressure sensor comprising
   a base assembly having a base member having a bottom wall and an upstanding sidewall defining an electronics chamber and a plurality of elongated terminals, the base member mounting the plurality of elongated terminals in spaced apart relation extending through the base wall into the electronics chamber, a flexible circuit having a substrate formed with first and second lobe portions with an intermediate portion therebetween, the flexible circuit being bent into a generally U-shaped configuration having an inner surface for mounting electronic components and an outer surface with the first lobe portion formed with terminal receiving holes through which respective elongated terminal members extend,
   a capacitive fluid pressure sensing element shaped generally as a polyhedron having a substrate side and a pressure sensing side with terminal pads on the pressure sensing side thereof, the second lobe portion of the flexible circuit having an end portion bent generally perpendicular relative to the remainder of the second lobe portion in a direction away from the first lobe portion with the flexible circuit in the U-shaped configuration, and formed with terminal pads thereon, the capacitive pressure sensing element received on the outer surface of the second lobe portion engaging the bent end thereof, electrically conductive, generally U-shaped edge clips having first and second legs, the first legs engaging respective terminal pads on the inner surface of the second lobe portion and the second legs engaging respective terminal pads on the pressure sensing side of the capacitive pressure sensing element, outer peripheral portions of the substrate side of the capacitive pressure sensing element received on a top surface portion of the base member sidewall,
   a cover member received over the capacitive pressure sensing element on the top surface of the base member, the cover member having a fluid pressure receiving opening therethrough, and
   a flexible annular gasket disposed between the cover member and the capacitive pressure sensing element, and
   a fluid coupling member attached to the base member.

2. A fluid pressure sensor comprising
   a generally cylindrical base assembly having a base member formed with a bottom wall and an upstanding generally circular sidewall defining an electronic chamber, a plurality of elongated terminals, the base member mounting the plurality of elongated terminals in spaced apart relation and extending through the bottom wall into the electronics chamber,
   signal conditioning electronics disposed in the electronics chamber electrically connected to the elongated terminals,
   a generally circular cover member received on the upstanding sidewall of the base member, the cover member having a top wall formed with a generally circular fluid pressure receiving opening therethrough, a first gasket seat formed in the bottom surface of the top wall having a plurality of spaced apart tab receiving surfaces, a second generally rectangular pressure sensor seat formed in the bottom surface of the top wall and aligned with the first gasket seat,
   an annular flexible gasket received through the circular opening of the cover member, the gasket having radially outwardly extending tabs, each tab received on a respective tab receiving surface,
   a capacitive fluid pressure sensing element having a generally rectangular periphery received on the second pressure sensor seat, the capacitive fluid pressure sensing element being electrically connected to the signal conditioning electronics, and
   a fluid coupling member attached to the base member.

3. A fluid pressure sensor according to claim 1 in which the capacitive fluid pressure sensing element comprises a relatively thick substrate having a top surface and a relatively thin diaphragm having a bottom surface attached to the substrate with the top surface of the substrate facing the bottom surface of the diaphragm, the substrate extending in one direction beyond the diaphragm exposing the top surface of the substrate and the terminal pads are located on the extended, exposed portions of the top surface of the substrate.

4. A fluid pressure sensor according to claim 1 in which first and second opposed notches are formed in the upstanding sidewall of the base member and the cover is formed with first and second legs, each leg having a free distal end formed with a lip, the lip of each leg being received in a respective notch in the upstanding sidewall to attach the cover to the base member.

5. A fluid pressure sensor according to claim 4 in which a slot is formed in the upstanding sidewall and the flexible circuit is formed with at least one conductive tail which is received through the slot extending beyond the base member and the fluid coupling member is formed of electrically conductive material and is received around the upstanding sidewall and in engagement with the conductive tail.

6. A fluid pressure sensor according to claim 5 in which the cover is formed with a third leg which is slidably received in the slot, the third leg having a distal end which is closely adjacent to the at least one conductive tail.

7. A fluid pressure sensor according to claim 1 in which the capacitive pressure sensing element has a plurality of corners and outer peripheral portions of the substrate side of the capacitive pressure sensing element received on the said a top surface portion of the base sidewall comprises at least some of the four corners.

8. A fluid pressure sensor comprising
  a flexible circuit having a substrate with an end portion bent generally perpendicular relative to an adjacent portion of the substrate and having terminal pads formed on the substrate,
  a capacitive fluid pressure sensing element having other terminal pads thereon, the sensor element received on the flexible circuit engaging the bent end portion thereof,
  generally U-shaped edge clips having first and second legs, the first legs biased into engagement with respective terminal pads on the flexible circuit and the second legs biased into engagement with respective terminal pads on the capacitive fluid pressure sensing element,
  a base, the capacitive fluid sensing element mounted on the base and a plurality of elongated terminals mounted on the base in spaced apart relation and electrically connected to the flexible circuit.

9. A fluid pressure sensor according to claim 7 in which the capacitive fluid pressure sensing element comprises a relatively thick substrate having a top surface and a relatively thin diaphragm having a bottom surface attached to the substrate with the top surface of the substrate facing the bottom surface of the diaphragm, the substrate extending in one direction beyond the diaphragm exposing the top surface of the substrate and the terminal pads are located on the extended, exposed portions of the top surface of the substrate.

10. A fluid pressure sensor according to claim 7 in which the base has an upstanding sidewall and first and second opposed notches are formed in the upstanding sidewall of the base member and further comprising a cover received on the base over the capacitive fluid pressure sensing element, the cover being formed with first and second legs, each leg having a free distal end formed with a lip, the lip of each leg received in a respective notch in the upstanding sidewall to attach the cover to the base member.

11. A fluid pressure sensor according to claim 9 further comprising an electrically conductive fluid coupling members and in which a slot is formed in the upstanding sidewall and the flexible circuit is formed with at least one conductive tail which is received through the slot extending beyond the base member and the fluid coupling member is received around the upstanding sidewall and in engagement with the conductive tail.

12. A fluid pressure sensor according to claim 10 in which the cover is formed with a third leg which is slidably received in the slot, the third leg having a distal end which is closely adjacent to the at least one conductive tail.

13. A condition responsive sensor comprising
  a flexible circuit having a substrate with an end portion bent generally perpendicular thereto and having terminal pads formed on the substrate,
  a condition responsive sensor element having terminal pads thereon,
  the condition responsive sensor element engaging the bent end portion,
  generally U-shaped edge clips having first and second legs, the first legs biased into engagement with respective terminal pads on the flexible circuit and the second legs biased into engagement with respective terminal pads on the condition responsive element,
  a base, the condition responsive sensor element mounted on the base and elongated terminals mounted on the base in spaced apart relation and generally connected to the flexible circuit.

* * * * *